United States Patent
Kwon

(10) Patent No.: US 10,162,320 B2
(45) Date of Patent: Dec. 25, 2018

(54) CENTRAL CONTROL APPARATUS AND CENTRAL CONTROL SYSYTEM AND DISPLAY METHOD OF CENTRAL CONTROL APPARATUS

(71) Applicant: LG ELECTRONICS INC., Seoul (KR)

(72) Inventor: Hyojung Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 518 days.

(21) Appl. No.: 14/814,641

(22) Filed: Jul. 31, 2015

(65) Prior Publication Data

US 2016/0033951 A1    Feb. 4, 2016

(30) Foreign Application Priority Data

Aug. 1, 2014 (KR) .......................... 10-2014-0099139

(51) Int. Cl.
| | | |
|---|---|---|
| G05B 15/00 | (2006.01) | |
| G05B 15/02 | (2006.01) | |
| G06Q 10/06 | (2012.01) | |
| G06Q 50/08 | (2012.01) | |

(52) U.S. Cl.
CPC ............. *G05B 15/02* (2013.01); *G06Q 10/06* (2013.01); *G06Q 50/08* (2013.01)

(58) Field of Classification Search
CPC ......... G05B 15/02; G06Q 10/06; G06Q 50/08
USPC .......................................................... 700/83
See application file for complete search history.

(56) References Cited

U.S. PATENT DOCUMENTS

| | | | | |
|---|---|---|---|---|
| 2006/0287999 | A1 | 12/2006 | Kawabata et al. | |
| 2011/0035693 | A1* | 2/2011 | Ueno ................. | G05B 23/0272 715/771 |
| 2012/0022700 | A1* | 1/2012 | Drees ..................... | G05B 15/02 700/276 |
| 2013/0138225 | A1* | 5/2013 | Gordon .............. | G05B 19/0421 700/33 |
| 2013/0304812 | A1* | 11/2013 | Yun ...................... | G06Q 10/063 709/203 |

(Continued)

FOREIGN PATENT DOCUMENTS

| | | |
|---|---|---|
| JP | 2001-350515 A | 12/2001 |
| JP | 2005-291610 A | 10/2005 |

(Continued)

OTHER PUBLICATIONS

Korean Office Action issued in Application No. 10-2014-0099139 dated Jul. 31, 2015.

(Continued)

*Primary Examiner* — Mohammad Ali
(74) *Attorney, Agent, or Firm* — Ked & Associates, LLP

(57) ABSTRACT

A central control apparatus, a central control system, and a display method of the central control apparatus in which at least one facility is managed. More particularly, a central control apparatus, a central control system, and a display method of the central control apparatus in which various history information needed for management and operation may be integrally displayed according to a time period such that an association between the various pieces of history information and a current status of facilities are provided at one time, so as to also efficiently control and manage facilities.

16 Claims, 8 Drawing Sheets

(56) References Cited

U.S. PATENT DOCUMENTS

2015/0112462 A1* 4/2015 Kuroiwa .............. F24F 11/0086
 700/90

FOREIGN PATENT DOCUMENTS

| JP | 2010-117912 A | 5/2010 |
|----|---------------|--------|
| WO | WO 2012/099345 A1 | 7/2012 |

OTHER PUBLICATIONS

European Search Report dated Dec. 2, 2015 issued in Application No. 15178771.0.

* cited by examiner

CONVENTIONAL FIG. 1A

MANAGEMENT AND CONTROL POINT HISTORY

| BMS Client2.0 | | | | | ✕ |
|---|---|---|---|---|---|
| 24 HOUR MANAGEMENT AND CONTROL POINT HISTORY | | | | | |
| TOTAL: 100 | | ADVANCED | GRAPH | EXPORT | NEXT |
| OCCURRENCE TIME | | NAME | | VALUE | |
| 2013.09.05 00:00:00.000 | | FREEZER2_COOLINGWATEREXITTEMPERATURE | | 27.2 | |
| 2013.09.04 23:59:00.000 | | FREEZER2_COOLINGWATEREXITTEMPERATURE | | 27.2 | |
| 2013.09.04 23:58:00.000 | | FREEZER2_COOLINGWATEREXITTEMPERATURE | | 27.2 | |
| 2013.09.04 23:57:00.000 | | FREEZER2_COOLINGWATEREXITTEMPERATURE | | 27.2 | |
| 2013.09.04 23:56:00.000 | | FREEZER2_COOLINGWATEREXITTEMPERATURE | | 27.2 | |
| 2013.09.04 23:55:00.000 | | FREEZER2_COOLINGWATEREXITTEMPERATURE | | 27.2 | |
| 2013.09.04 23:54:00.000 | | FREEZER2_COOLINGWATEREXITTEMPERATURE | | 27.2 | |
| 2013.09.04 23:53:00.000 | | FREEZER2_COOLINGWATEREXITTEMPERATURE | | 27.2 | |
| 2013.09.04 23:52:00.000 | | FREEZER2_COOLINGWATEREXITTEMPERATURE | | 27.2 | |
| 2013.09.04 23:51:00.000 | | FREEZER2_COOLINGWATEREXITTEMPERATURE | | 27.2 | |
| | | | | | CLOSE |

CONVENTIONAL FIG. 1B

HISTORY OF USER ACTION

ACTION HISTORY [HIDE DETAILS]

OCCURRENCE TIME — START 2013.09.03 / END 2013.09.05
RANGE — ALL
USER ACTION — ALL
TARGET LIST — [ADD] [DELETE]
USER ID — admin
[INITIALIZE] [SEARCH]

TOTAL: 5 [EXPORT] [NEXT]

| OCCURRENCE TIME | USER ID | TARGET NAME | TARGET VALUE | USER ACTION | ACCESS TYPE |
|---|---|---|---|---|---|
| Contains | Contains | Contains | Contains | Contains | Contains |
| 2013.09.04 18:15:28.301 | admin | admin | 4592424404 | MODIFY NETWORK | ENGINEERING TOOL |
| 2013.09.04 13:48:41.876 | admin | admin | 1063526678 | LOGIN | ENGINEERING TOOL |
| 2013.09.03 17:30:08.635 | admin | admin | 177000595 | LOGIN | ENGINEERING TOOL |
| 2013.09.03 17:27:03.142 | admin | admin | 1770035951 | LOGOUT | ENGINEERING TOOL |
| 2013.09.03 14:58:38.956 | admin | admin | 1778605967 | LOGIN | ENGINEERING TOOL |

CONVENTIONAL FIG. 2A

ALARM HISTORY

HISTORYOFALARMFOR24HOURS/UXD_GANGSEOBUILDING/FREEZER_FREEZINGTOWER/FREEZER2_COOLINGWATEREXITTEMPERATURE

TOTAL: 2 — ADVANCED | EXPORT | NEXT

MAKE GROUP BY DRAGGING COLUMN

| TYPE | GRADE | OCCURRENCE TIME | OCCURRENCE VALUE | CHECK TIME | CHECKER | NOTES |
|---|---|---|---|---|---|---|
| TARGET VALUE | NORMAL | 2013.11.03 ... | 30 | | | |
| TARGET VALUE | MINOR | 2013.11.03 ... | 31 | | | |

CONVENTIONAL FIG. 2B

PREDICTION HISTORY/PREDICTION SETTING

ACTION HISTORY  [HIDE DETAILS]

OCCURRENCE TIME
START: 2013.09.03 00 00
END: 2013.09.05 00 00

RANGE: PREDICTIVE RANGE
USER ACTION: PREDICTION EXECUTION

TARGET LIST: Freezer2_StopOperation [ADD] [DELETE]

USER ID: admin  [INITIALIZE] [SEARCH]

TOTAL: 2  [EXPORT] [NEXT]

| OCCURRENCE TIME | USER ID | TARGET NAME | TARGET VALUE | USER ACTION | ACCESS TYPE |
|---|---|---|---|---|---|
| Contains | Contains | Contains | Contains | Contains | Contains |
| 2013.09.04 06:54:00.000 | PREDICTION | UXD_GANGSEO... | OFF | EXECUTE PREDICTION | |
| 2013.09.04 06:59:00.000 | PREDICTION | UXD_GANGSEO... | ON | EXECUTE PREDICTION | |

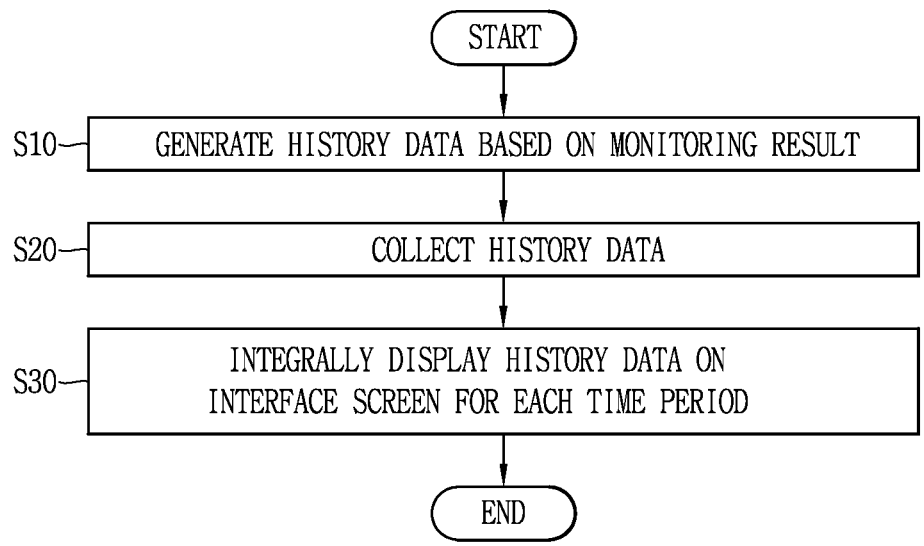
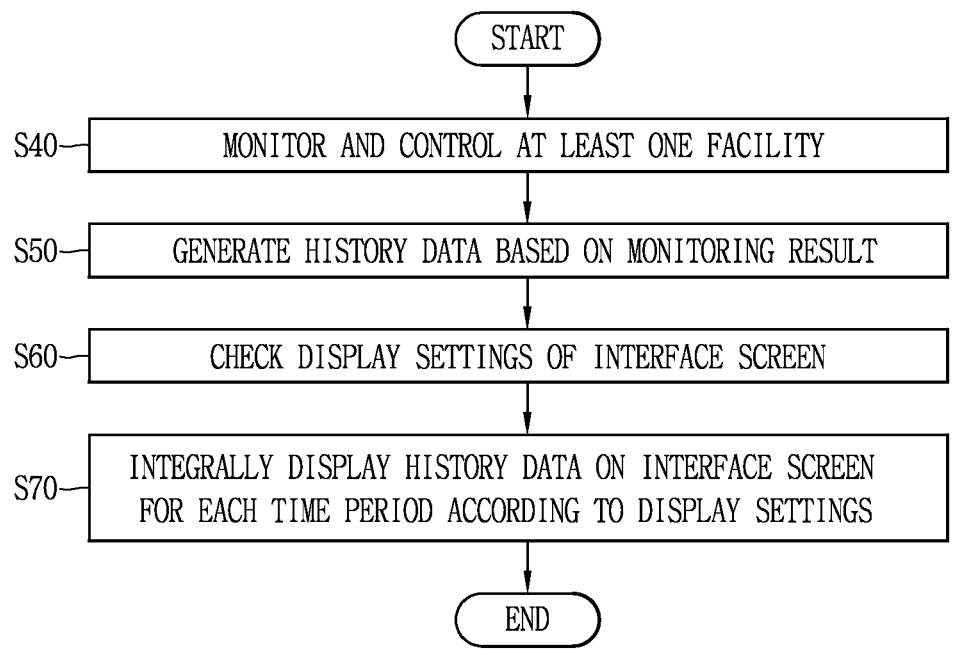

CENTRAL CONTROL APPARATUS AND CENTRAL CONTROL SYSYTEM AND DISPLAY METHOD OF CENTRAL CONTROL APPARATUS

CROSS-REFERENCE TO RELATED APPLICATIONS

The present disclosure relates to subject matter contained in priority Korean Application No. 10-2014-0099139, filed on Aug. 1, 2014 which is herein expressly incorporated by reference in its entirety.

TECHNICAL FIELD

The present invention relates to a central control apparatus, a central control system, and a display method of the central control apparatus in which at least one facility is managed, and more particularly, to a central control apparatus, a central control system, and a display method of the central control apparatus in which history data of at least one facility is integrally displayed for each time period and information regarding the entire system is provided at one time.

BACKGROUND ART

A build management system is a system that functions to control and monitor various facilities in a building. A building management system performs classification on various facilities in a building in units of management and control points. A management and control point include, for example, an on/off illumination lamp, a dimming illumination lamp, an on/off fan, a damper, a valve, and a temperature sensor and represents a minimum unit for facilities in a building.

A building management system provides various functions such as a history of a user or a management and control point, a reservation, or an alarm. From thereamong, the history is classified into histories for a management and control point, a user action, a reservation control, and an alarm. When a problem occurs while operating a building, operators find out the cause through the above-described various functions for real-time monitoring and history check. A building management system provides a search function for various histories. Upon problem occurrence or in order for efficient operation of a building, operators use the histories and the real-time monitoring function.

Conventionally, however, various types of history searches are performed individually as shown in FIGS. 1 and 2. That is, in order to find out a cause of a problem, an operator should search for one type of history and memorize an associated search result through one procedure with user interface (UI) or the like and search for and memorize another type of history through another procedure (UI or the like) to infer a relation therebetween. In addition, when an operator should search for various types of histories or search for histories of multiple points because the cause of the problem is complicated, it is difficult to find out a related problem, thereby reducing building operating efficiency. This causes problems in that recognition cost for an operator is increased, the operator is likely to depend on his/her experience, and information such as histories is distributed, thereby making it difficult for the operator to perform integrated search and intuitive decision.

DISCLOSURE OF THE INVENTION

Therefore, an object of the present invention is to provide a central control apparatus, a central control system, and a display method of the central control apparatus in which various history data needed for management and operation may be integrally displayed according to a time period such that an association between the various pieces of history information and a current status of facilities are figured out at one time in order to overcome a limitation of the conventional technique and also efficiently control and manage facilities.

To achieve these and other advantages and in accordance with the purpose of the present invention, as embodied and broadly described herein, there is provided a central control apparatus that manages at least one facility, which is disclosed in this specification in order to solve the above problem, including: a processing unit configured to generate history data regarding the at least one facility based on a result of monitoring a state of the at least one facility and enable the history data to be integrally displayed on an interface screen outwardly output and displayed according to a time period; and a display unit configured to outwardly display the interface screen on which the history data is displayed and display setting of the history data is made.

In an embodiment, the monitoring result may include at least one piece of information of an operation state, an operation mode state, a control command state, and an energy consumption state of the at least one facility.

In an embodiment, the interface screen may include a time line window in which the history data is displayed according to the time period; and at least one setting window in which the display setting of the history data is made.

In an embodiment, a type of the at least one facility may be displayed in the time line window, and the history data corresponding to the at least one facility may be displayed according to the time period.

In an embodiment, the history data may be displayed in the form of a graph such that variation is shown according to the time period.

In an embodiment, at least one of a type, a display style, and a specific date and time period of the history data to be displayed in the time line window or a combination thereof may be set in the setting window.

In an embodiment, the type of the history data may be composed of a group classified according to any one of a floor or area in which the at least one facility is installed and a use of the at least one facility, and the history data corresponding to the group selected through the setting window may be displayed in the time line window.

In an embodiment, the display style may be a form or color in which the history data is displayed, and the history data corresponding to the form or color selected through the setting window may be displayed in the time line window.

In an embodiment, the specific date and time period may be a date and time period on which the history data is to be displayed, and the history data corresponding to the specific date and time period selected through the setting window may be displayed in the time line window.

In an embodiment, the processing unit may enable the history data to be displayed according to the display setting selected through the interface screen.

In an embodiment, the processing unit may perform a linear regression analysis based on past and current history data, predict variation in the history data, and enable a prediction result to be displayed.

In an embodiment, the processing unit may determine whether to additionally generate the history data every time period and enable the additionally generated history data to be displayed.

In an embodiment, a control command for the at least one facility may be input through the interface screen, and the processing unit may generate control history data in response to the control command to enable the generated control history data to be displayed on the interface screen and enable the at least one facility to be controlled according to the control command.

In an embodiment, a predictive control command for the at least one facility may be input through the interface screen, and the processing unit may generate predictive history data in response to the predictive control command to enable the generated predictive history data to be displayed on the interface screen and enable the at least one facility to be controlled according to the predictive control command.

In an embodiment, a search and check of the history data may be made through the interface screen, and the processing unit may enable the history data corresponding to the search and check and information regarding the at least one facility corresponding to the history data to be displayed.

A central control system that manages at least one facility, which is disclosed in this specification in order to solve the above problem, includes: a management and control unit configured to monitor and control the at least one facility; and a central control apparatus including: a processing unit configured to generate history data regarding the at least one facility based on a monitoring result of the management and control unit and enable the history data to be integrally displayed on an interface screen outwardly output and displayed according to a time period; and a display unit configured to outwardly display the interface screen on which the history data is displayed and a display setting of the history data is made.

In addition, a central control system that manages at least one facility, which is disclosed in this specification, includes: a management and control unit configured to monitor and control the at least one facility, a processing unit configured to generate history data regarding the at least one facility based on a monitoring result of the management and control unit and enable the history data to be integrally displayed on an interface screen outwardly output and displayed according to a time period; and a display unit configured to outwardly display the interface screen on which the history data is displayed and a display setting of the history data is made.

In an embodiment, the monitoring result may include at least one piece of information of an operation state, an operation mode state, a control command state, and an energy consumption state of the at least one facility.

In an embodiment, the interface screen may include a time line window in which the history data is displayed according to the time period; and at least one setting window in which the display setting of the history data is made.

In an embodiment, a type of the at least one facility may be displayed in the time line window, and the history data corresponding to the at least one facility may be displayed according to the time period.

In an embodiment, the history data may be displayed in the form of a graph such that variation with time is shown.

In an embodiment, at least one of a type, a display style, and a specific date time period of the history data to be displayed in the time line window or a combination thereof may be set in the setting window.

In an embodiment, the type of the history data is composed of a group classified according to any one of a floor or area in which the at least one facility is installed and a use of the at least one facility, and the history data corresponding to the group selected through the setting window may be displayed in the time line window.

In an embodiment, the display style may be a form or color in which the history data is displayed, and the history data corresponding to the form or color selected through the setting window may be displayed in the time line window.

In an embodiment, the specific date and time period may be a date and time period on which the history data is to be displayed, and the history data corresponding to the specific date and time period selected through the setting window may be displayed in the time line window.

In an embodiment, the processing unit may generate the history data for each time period.

In an embodiment, the processing unit may enable the history data to be displayed according to a display setting and a display method selected through the interface screen.

In an embodiment, the processing unit may perform a linear regression analysis based on past and current history data, predict variation in the history data, and enable a prediction result to be displayed.

In an embodiment, the processing unit may determine whether to additionally generate the history data every time period and enable the additionally generated history data to be displayed.

In an embodiment, a control command for the at least one facility may be input through the interface screen, the processing unit may generate control history data in response to the control command to enable the generated control history data to be displayed on the interface screen, and the management and control unit may control the at least one facility according to the control command.

In an embodiment, a predictive control command for the at least one facility may be input through the interface screen, the processing unit may generate predictive history data in response to the predictive control command to enable the generated predictive history data to be displayed on the interface screen, and the management and control unit may control the at least one facility according to the predictive control command.

In an embodiment, a search and check of the history data may be made through the interface screen, and the processing unit may enable the history data corresponding to the search and check and information regarding the at least one facility corresponding to the history data to be displayed.

A display method of a central control apparatus that outwardly displays history data regarding at least one facility through an interface screen, which is displayed in the specification, includes generating the history data based on a result of monitoring the at least one facility, collecting the history data, and integrally displaying the history data on the interface screen for each time period.

In an embodiment, the display method may further include making a display setting for the display method on the interface screen.

In addition, a central control method that manages at least one facility, which is disclosed in the specification, includes monitoring and controlling at least one facility, generating history data regarding the at least one facility on the basis of a monitoring result obtained through the monitoring and controlling, checking display settings of an interface screen outwardly output and displayed, and integrally displaying the history data on the interface screen for each time period according to the display setting.

The central control apparatus, the central control system, and the display method of the central control apparatus disclosed in the specification may have an effect of easily and conveniently figuring out information regarding a management history and a current status of the entire facility system by integrally displaying various pieces of history information needed to operate and manage the entire facility according to the time period.

The central control apparatus, the central control system, and the display method of the central control apparatus disclosed in the specification have an effect of intuitively determining an association between various pieces of history information by integrally displaying the various pieces of history information needed to operate and manage the entire facility according to the time period.

The central control apparatus, the central control system, and the display method of the central control apparatus disclosed in the specification have an effect of intuitively determining information regarding a current status of the entire facility system by integrally displaying the various pieces of history information needed to operate and manage the entire facility according to the time period.

The central control apparatus, the central control system, and the display method of the central control apparatus disclosed in the specification have an effect of performing efficient management according to the current status of the entire system by intuitively determining the association between the various pieces of history information and information regarding a current status of the entire building.

The central control apparatus, the central control system, and the display method of the central control apparatus disclosed in the specification have an effect of efficiently managing and monitoring an individual facility by intuitively determining the association between the various pieces of history information and information regarding a current status of the entire building.

BRIEF DESCRIPTION OF THE DRAWINGS

FIG. 1A is a first exemplary view A illustrating an example of a history management screen in a conventional building control system;

FIG. 1B is a first exemplary view B illustrating an example of a history management screen in a conventional building control system;

FIG. 2A is a second exemplary view A illustrating an example of a history management screen in a conventional building control system;

FIG. 2B is a second exemplary view B illustrating an example of a history management screen in a conventional building control system;

FIG. 9 is a flowchart showing a display method of a central control apparatus disclosed in this specification; and FIG. 10 is a flowchart showing a sequence of a building management method disclosed in this specification.

MODES FOR CARRYING OUT THE PREFERRED EMBODIMENTS

Figure 3:
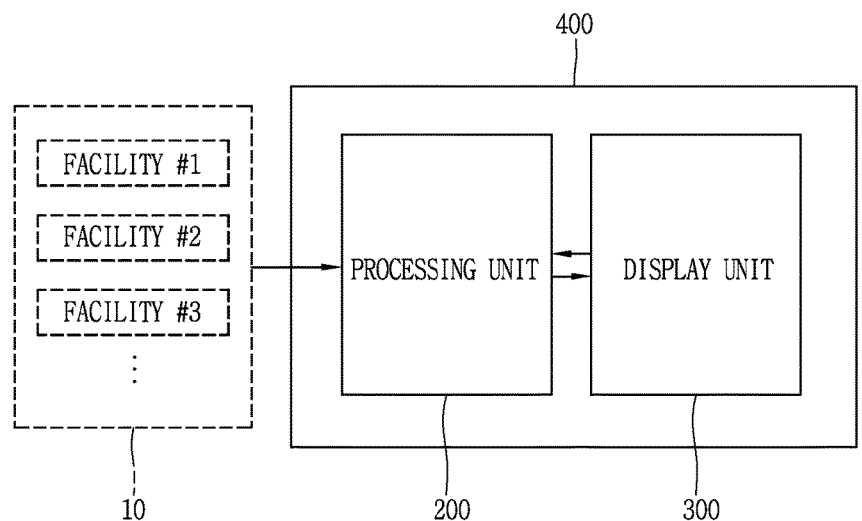
FIG. 3 is a block diagram showing a configuration of a central control apparatus disclosed in this specification.

The present invention disclosed in this specification may be applied to a central control apparatus, a central control system, and a display method of the central control apparatus. However, techniques disclosed in the specification is not limited thereto, but may be applied to all existing types of equipment integration control apparatuses and systems, plant control apparatuses and systems, building history management apparatuses and systems, integration control apparatuses and systems, an information display method thereof, a data processing method thereof, and a data display method thereof, to which technical spirit of the present invention may be applied, and in particular may be usefully applied to and practiced by an interface that is applied to the above apparatuses and systems and software for driving the interface.

It should be noted that technical terms used herein are merely used to describe a specific embodiment, but not to limit the technical ideal disclosed in the specification. Also, unless particularly defined otherwise, technical terms used herein should be construed as a meaning that is generally understood by those having ordinary skill in the art to which the invention pertains, and should not be construed too broadly or too narrowly. Furthermore, if technical terms used herein are wrong terms unable to correctly express the technical idea of the invention, then they should be replaced by technical terms that are properly understood by those skilled in the art. In addition, general terms used herein should be construed based on the definition of dictionary, or the context, and should not be construed too narrowly.

The singular forms 'a,' 'an,' and 'the' include plural reference unless the context clearly dictates otherwise. In this application, the terms "comprising" and "including" should not be construed to necessarily include all of the elements or steps disclosed herein, and should be construed not to include some of the elements or steps thereof, or should be construed to further include additional elements or steps.

Hereinafter, preferred embodiments of the present invention will be described in detail with reference to the accompanying drawings, and the same or similar elements are designated with the same numeral references regardless of the numerals in the drawings and their redundant description will be omitted.

In describing techniques disclosed in the specification, moreover, the detailed description will be omitted when a specific description for publicly known technologies to which the invention pertains is judged to obscure the gist of the present invention. Also, it should be noted that the accompanying drawings are merely illustrated to easily explain the technical idea of the invention, and therefore, they should not be construed to limit the technical idea of the invention by the accompanying drawings.

A central control apparatus and a central control system disclosed in the specification will be described below with reference to FIGS. 3 to 10.

First, a configuration of the central control apparatus disclosed in the specification will be described with reference to FIGS. 3 and 4.

The central control apparatus disclosed in the specification may be implemented with some or a combination of elements or steps included in embodiments to be described below or may be implemented as a combination of the embodiments. Technical terms used herein are merely used to describe a specific embodiment, but not to limit the technical ideal disclosed in the specification.

The central control apparatus manages at least one facility.

As shown in FIG. 3, the central control apparatus 400 includes a processing unit 200 configured to generate history data regarding at least one facility 10 for each time period on the basis of a result of monitoring a state of the facility 10 and integrally display the history data according to the time period on an interface screen that is output and displayed outwardly and a display unit 300 configured to outwardly display the interface screen on which the history data is displayed and a display setting of the history data is made.

Figure 4:
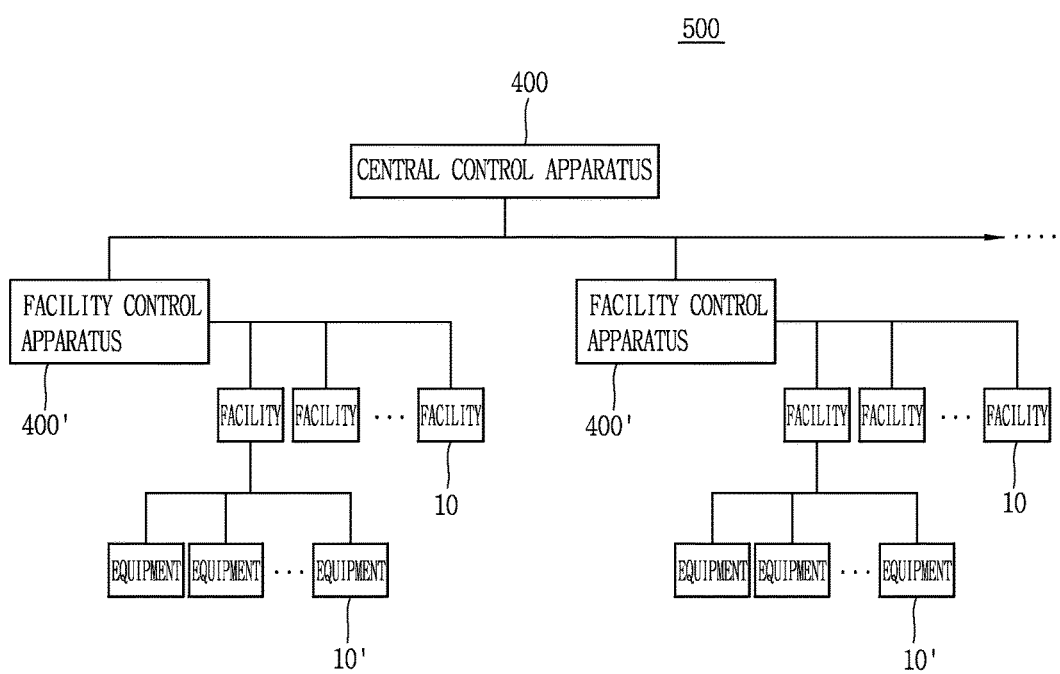
FIG. 4 is an exemplary view illustrating an application of a central control apparatus and a central control system disclosed in this specification.

In a central control system 500 as shown in FIG. 4, the central control apparatus 400 may be applied to at least one facility control apparatus 400' that controls the at least one facility 10 or applied as a central control apparatus 400 that controls the at least one facility control apparatus 400'.

The configuration of the central control system 500 shown in FIG. 4 is an example for describing the central control apparatus 400, and the central control apparatus 400 may be formed to have another configuration, except for that shown in FIG. 4.

The central control apparatus 400 may be, or may be included in, a management apparatus installed inside a building.

The central control apparatus 400 may also be, or may be included in, an apparatus that remotely manages a building.

The central control apparatus 400 may be installed in a central control point or center that manages a building.

The central control apparatus 400 may be installed inside or outside a building or included in an apparatus that manages the at least one facility 10 inside or outside the building to manage and monitor the at least one facility 10.

The at least one facility 10 may be at least one of an air conditioning facility, an indoor device, a illumination facility, a communication facility, a water supply facility, and a power facility. The at least one facility 10 may include equipment 10'.

The central control apparatus 400 may receive a result of monitoring a state of the at least one facility 10 from the at least one facility 10, a control apparatus that integrally controls the at least one facility 10, or a sensing apparatus that senses a state of the at least one facility 10.

The central control apparatus 400 may receive the monitoring result in real time.

The monitoring result may include at least one piece of information of an operation state, an operation mode state, a control command state, and an energy consumption state of the at least one facility 10.

That is, the monitoring result may include current status information of the at least one facility 10.

The monitoring result may be a result for the al least one facility 10.

That is, the monitoring result may have the same number of contents as the number of facilities 10.

The monitoring result may be transmitted to the processing unit 200 of the central control apparatus 400 every hour.

The processing unit 200 at least generates the history data for each time period on the basis of the monitoring result.

The processing unit 200 may generate the history data every hour.

For example, the history data may be generated every hour, such as [18:00], [19:00], and [20:00].

The processing unit 200 may generate the history data in units of seconds/minutes/hours.

Upon generating the history data, the processing unit 200 may generate the history data such that a time at which the history data is generated is recorded.

For example, when the monitoring result is received at [2014/07/17 16:00:24], the processing unit 200 may generate the history data such that a time of [2014/07/17 16:00:24] is recorded in the history data.

The processing unit 200 enables the history data to be integrally displayed on the interface screen for each time period.

That is, the history data may be integrally displayed on the interface screen and may be displayed according to a time at which the history data is generated.

The processing unit 200 allows the display unit 300 to outwardly display the interface screen on which the history data is displayed and the display setting of the history data is made.

That is, the interface screen may be displayed on the display unit 300 by the processing unit 200.

The interface screen may be a screen including rows in which a list of the history data is displayed and columns in which the history data is displayed for each time period such that the history data is integrally displayed for each time period.

The interface screen may be a screen that is output outwardly through the display unit 300 and displayed to a user.

That is, the interface screen may be an interface screen of an operating program of the central control apparatus 400, which is provided to a user who uses the central control apparatus 400.

A detailed embodiment of the central control apparatus disclosed in the specification will be described below with further reference to FIGS. 5 and 7, assuming and focusing on an application in which the central control apparatus is applied to manage a building.

The central control apparatus 400 includes the processing unit 200 and the display unit 300. As shown in FIG. 5, the interface screen 310 may further include a time line window 311 in which the history data is displayed according to a time period and at least one setting window 312a, 312b, 312c in which the display setting of the history data is made.

Figure 5:
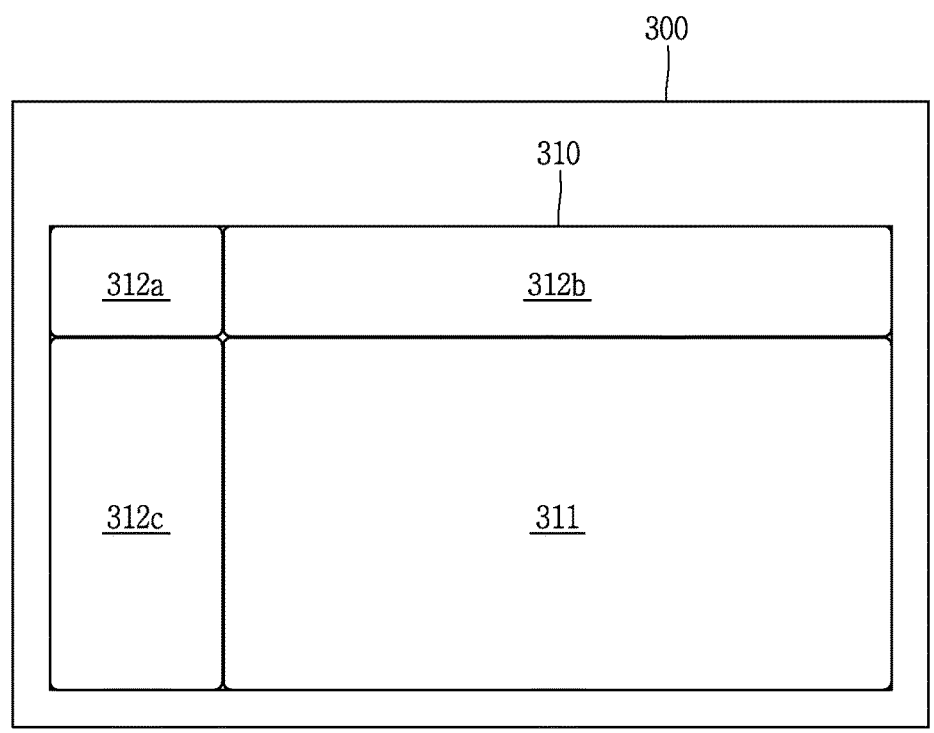
FIG. 5 is a first exemplary view illustrating a display unit and an interface screen according to an embodiment of a central control apparatus and a central control system disclosed in this specification.

That is, the interface screen 310 may be composed of a plurality of frames, as shown in FIG. 5.

A type of the at least one facility 10 is displayed in the time line window 311, and the history data corresponding to the at least one facility 10 may be displayed according to the time period.

The type of the at least one facility 10 may be displayed in at least one of the setting windows 312a, 312b, and 312c.

In the time line window 311, the history data corresponding to the at least one facility 10 is displayed according to the time period, and the history data may be displayed in the form of a graph such that variation is represented with the time period.

Figure 6:
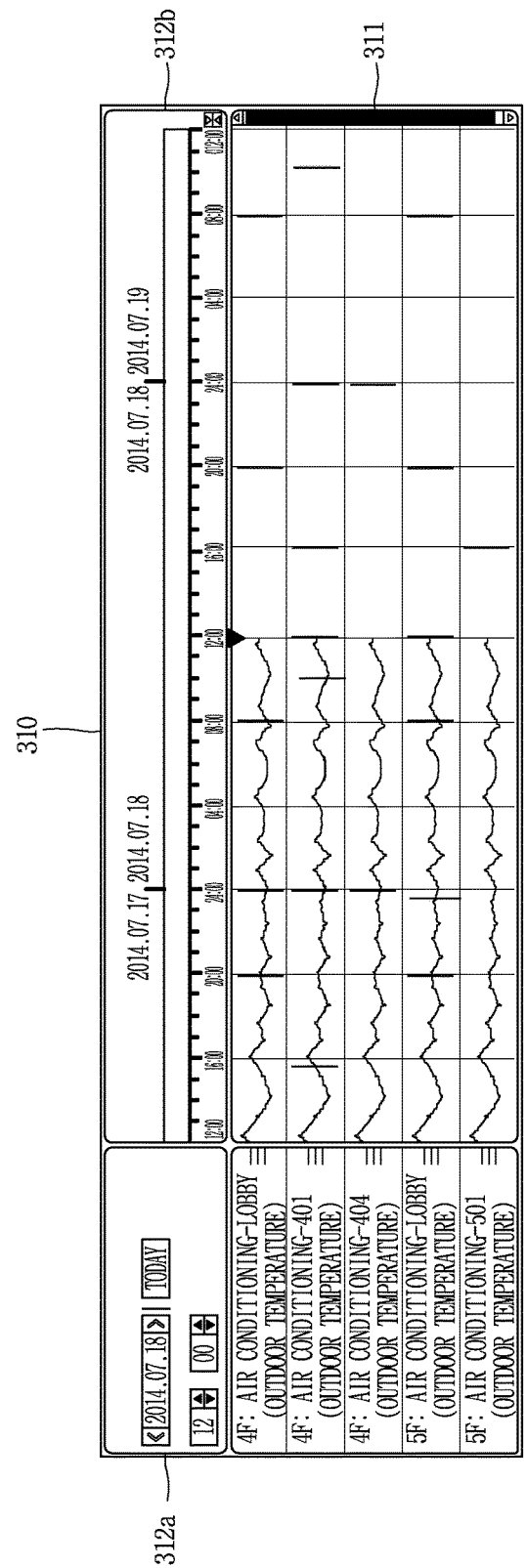
FIG. 6 is a second exemplary view illustrating a display unit and an interface screen according to an embodiment of a central control apparatus and a central control system disclosed in this specification.

FIG. 6 shows such an example. As shown in FIG. 6, the history data may be displayed in the time line window 311 as a graph such that the variation is represented according to the time period, and the type of the at least one facility 10 corresponding to the history data displayed in the time line window 311 may be displayed in setting window 312*c*, which is one of the setting windows 312*a*, 312*b*, and 312*c*.

At least one of a type, a display style, and a specific date and time period of the history data to be displayed in the time line window 311 or a combination thereof may be set in the setting windows 312*a*, 312*b*, and 312*c*.

For example, as shown in FIG. 6, setting window 312*a* may include a setting menu for setting a date on which the history data is to be displayed or checked, setting window 312*b* may include a setting menu for setting a specific time on which the history data is to be displayed or checked, and setting window 312*c* may include a setting menu for setting a type of the history data or a list of a facility to be checked among the at least one facility 10.

The type of the history data may be composed of a group classified according to any one of a floor or area in which the at least one facility 10 is installed and a use of the at least one facility 10.

When the type of the history data is selected in the setting windows 312*a*, 312*b*, and 312*c*, the history data corresponding to a group selected through the setting window may be displayed in the time line window 311.

For example, as shown in FIG. 6, when the at least one facility 10, which is installed in the 4th floor of a building to be managed, is checked, a group of the at least one facility 10 installed in the 4th floor of the building is selected in the setting windows 312*a*, 312*b*, and 312*c*, and the history data corresponding to the selected group may be displayed in the time line window 311.

For the type of the history data, the setting of the history data to be displayed may be made regardless of the group.

The display style may be a form or color in which the history data is displayed.

For example, the form may be any one of a curved form, a bar graph form, and a numerical form, and the color may be a color in which the form is displayed.

When the display style is selected in the setting windows 312*a*, 312*b*, and 312*c*, the history data may be displayed in the time line window 311 according to the form or color selected through the setting windows 312*a*, 312*b*, and 312*c*.

For example, when the form and the color in which the history data is displayed are set as a bar graph form and a red color through the setting windows 312*a*, 312*b*, and 312*c*, respectively, the history data may be displayed in the time line window 311 in the form of a red bar graph.

The display style may be set for each piece of history data.

The specific date and time period may be a date and time period on which the history data is to be displayed.

That is, the specific date and time period may be the date and time period on which the history data is to be displayed or checked.

When the specific date and time period are set in the setting windows 312*a*, 312*b*, and 312*c*, the history data corresponding to the specific date and time period selected through the setting windows 312*a*, 312*b*, and 312*c* may be displayed in the time line window 311.

For example, as shown in FIG. 6, when [2014/07/18] is set in setting window 312*a* as a date on which the history data is to be displayed, and [2014/07/18 12:00~2014/07/19 12:00] is set in setting window 312*b* as a time period on which the history data is to be displayed, the history data corresponding to the time period of [2014/07/18 12:00~2014/07/19 12:00] may be displayed in the time line window 311.

When a display setting is selected through the setting windows 312*a*, 312*b*, and 312*c*, display settings of the display unit 300 and the interface screen 310 may be made by the processing unit 200.

The processing unit 200 may enable the history data to be displayed according to the display setting selected through the interface screen 310.

That is, the processing unit 200 enables the display setting selected through the interface screen 310 to be applied to the interface screen 310.

That is, the history data may be displayed in the time line window 311 according to the setting selected through the setting windows 312*a*, 312*b*, and 312*c*.

The processing unit 200 may perform a linear regression analysis on the basis of the past and present history data, predict variation in the history data, and enable a prediction result to be displayed.

That is, the processing unit 200 may predict variation and its result of the future through the linear regression analysis of the past and present history data and also enable the prediction result to be displayed on the interface screen 310 in addition to enabling the past and present history data to be displayed on the interface screen 310.

In this case, the prediction result may be displayed in a form and color different from those of the past and present history data.

The processing unit 200 may determine whether to additionally generate the history data every time period and enable the additionally generated history data to be displayed.

That is, the processing unit may enable the history data generated additionally every hour to be displayed on the interface screen 310 and reflect a current status of the at least one facility 10.

The central control apparatus 400 may enable a control command for the at least one facility 10 to be input through the interface screen 310. The processing unit 200 may generate control history data in response to the control command to enable the generated control history data to be displayed on the interface screen 310 and enable the at least one facility 10 to be controlled according to the control command.

That is, when a control of the at least one facility 10 is set on the interface screen 310, a signal for the setting is input. Then, the processing unit 200 generates the control history data on the basis of the input signal to enable the control history data to be displayed on the interface screen 310, and delivers the input signal to the at least one facility 10 or a controller that controls the at least one facility 10 to enable the at least one facility 10 to be controlled according to the control command.

Examples of the control command may include an operation of the at least one facility 10, a switching of an operating mode, cooperation with another facility, and an adjustment of operational intensity.

Specifically, for example, when an operation of any one of the at least one facility 10 is set to be stopped through the interface screen 310, a signal for the setting is input and delivered to the processing unit 200. Then the processing unit 200 generates the control history data in response to the input signal to enable the control history data to be displayed on the interface screen 310 at a corresponding time, and delivers the input signal to a facility corresponding to a target of the control command or a controller of the facility to enable the operation of the facility to be stopped or controlled to be stopped.

The central control apparatus 400 may also enable a predictive control command for the at least one facility 10 to be input through the interface screen 310. The processing unit 200 may generate predictive history data in response to the predictive control command to enable the generated predictive history data to be displayed on the interface screen 310 and enable the at least one facility 10 to be controlled according to the predictive control command.

That is, when a predictive control of the at least one facility 10 is set on the interface screen 310, a signal for the setting is input. Then, the processing unit 200 generates the predictive history data on the basis of the input signal to enable the predictive history data to be displayed on the interface screen 310, and delivers the input signal to the at least one facility 10 or a controller that controls the at least one facility 10 to enable the at least one facility 10 to be controlled according to the predictive control command.

Specifically, for example, when an operation of any one of the at least one facility 10 is set to be stopped at [2014/07/18 12:00:00] through the interface screen 310, a signal for the setting is input and delivered to the processing unit 200. Then the processing unit 200 generates the predictive history data in response to the input signal to enable the predictive history data to be displayed on the interface screen 310 at a time period of [2014/07/18 12:00:00], and delivers the input signal to a facility corresponding to a target of the control command or a controller of the facility to enable the operation of the facility to be stopped or controlled to be stopped at [2014/07/18 12:00:00].

The central control apparatus 400 may also enable a search and check of the history data through the interface screen 310. The processing unit 200 may enable the history data corresponding to the search and check and information regarding at least one facility 10 corresponding to the history data to be displayed.

As described above, an embodiment of the central control apparatus 400 may be carried out in an exemplary form as shown in FIG. 6. An example of the interface screen 310 of the central control apparatus 400 will be described below in detail with reference to FIG. 6.

Figure 7:
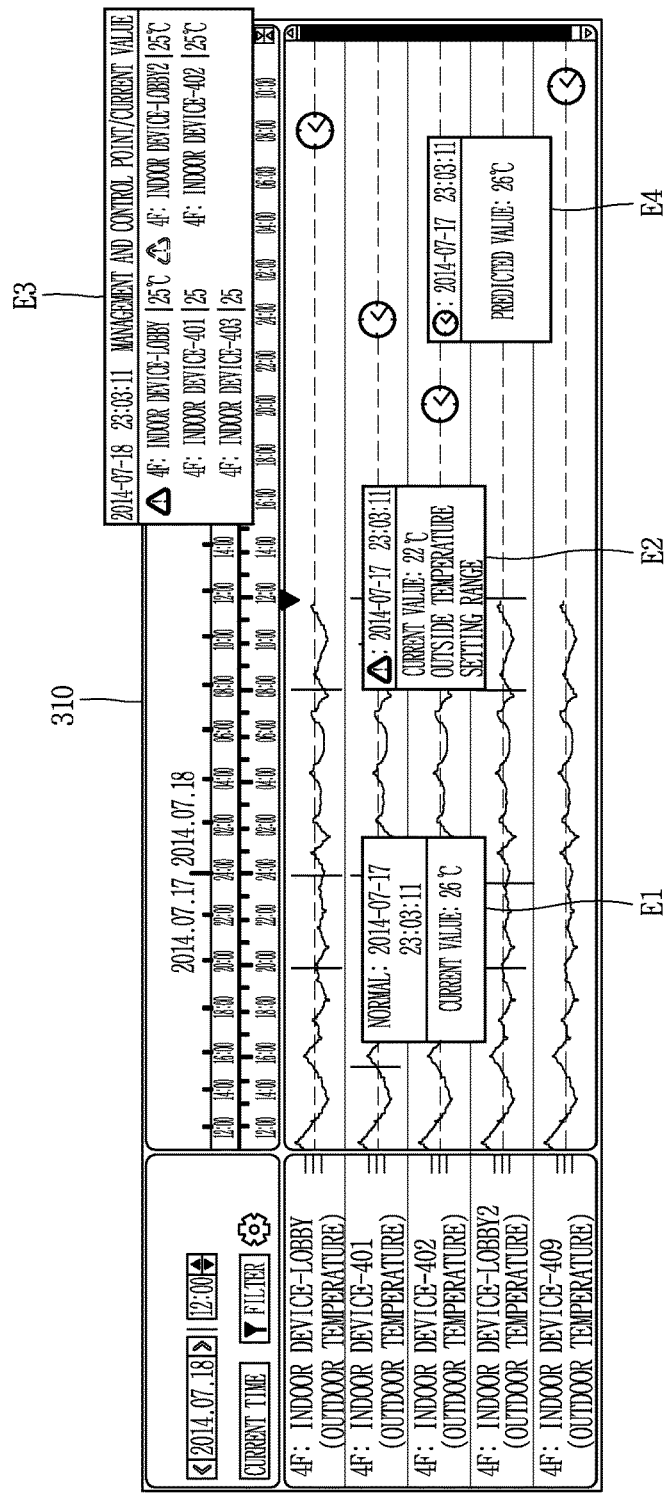
FIG. 7 is a third exemplary view illustrating a display unit and an interface screen according to an embodiment of a central control apparatus and a central control system disclosed in this specification.

As shown in FIG. 7, the interface screen 310 may be output outwardly through the display unit 300 and thus displayed to a user.

The interface screen 310 is composed of a plurality of windows. In each window, the display setting of the interface screen 310 may be made, and the history data may be displayed.

The interface screen 310 is provided to a user who uses the central control apparatus 400 in the form of an operating program. The search and check of the history data and the setting and changing of the interface screen 310 may be made through an external input means by the user.

The interface screen 310 may be manipulated through the input means.

For example, on a condition that the input means a keyboard and a mouse, the history data may be displayed or the interface screen 310 may be manipulated according to a route in which a cursor of the mouse moves on the interface screen 310, an input through the keyboard, or the like.

In this case, the input through the input means may be processed through the processing unit 200, and the processing result may be output and displayed on the interface screen 310.

For example, on a condition that the input means a mouse, when the cursor of the mouse is moved, a signal corresponding to the moving route is input and delivered to the processing unit 200. Then the processing unit 200 may perform processing such that a result caused by the input signal is output and displayed on the interface screen 310 and thus enable the result to be output and displayed on the interface screen 310 according to the moving route of the cursor of the mouse.

On the interface screen 310, the history data regarding the at least one facility 10 is integrally displayed for each time period and thus current status information of the entire building may be displayed.

In the interface screen 310, the past and present history data may be displayed, and also a prediction result of variation in the history data may be displayed.

The control history data according to a control command for the at least one facility 10 may also be displayed on the interface screen 310.

The predictive history data according to a predictive control command for the at least one facility 10 may also be displayed on the interface screen 310.

A result of the search and check of the history data may also be displayed on the interface screen 310.

These functions provided on the interface screen 310 may be displayed in the form of the setting windows or icons of the interface screen 310 and performed through manipulation of the input means.

For example, on a condition that the input means is a mouse and history data regarding any one of the at least one facility 10 intends to be checked, when the cursor of the mouse is moved to a facility and a time period corresponding to a target to be checked on the interface screen 310, specific history data windows E1 and E2 corresponding to the facility and the time period may be displayed on the interface screen 310.

Alternatively, on a condition that predictive history data regarding any one of the at least one facility 10 intends to be checked, when the cursor of the mouse is moved to a facility and a predicted time period corresponding to a target to be checked on the interface screen 310, a specific predictive history data window E4 corresponding to the facility and the predicted time period may be displayed on the interface screen 310.

Alternatively, on a condition that the entire current status of the building to be managed intends to be checked, when the cursor of the mouse is moved to a selected window or icon (not shown) corresponding to the check of the entire current status of the building on the interface screen 310 and then the selected window or icon is clicked, a history data window E3 regarding the entire current status of the building may be displayed on the interface screen 310.

A configuration of the central control system disclosed in the specification will be described with reference to FIG. 8.

The central control system disclosed in the specification may be implemented with some or a combination of elements or steps included in the above-described embodiments or may be implemented as a combination of the embodiments. Technical terms used herein are merely used to describe a specific embodiment, but not to limit the technical ideal disclosed in the specification.

The central control system (hereinafter, referred to as a system) manages at least one facility.

The system 500 may be configured in the form of the central control system 500 as shown in FIG. 4.

The system 500 may be configured in the form of addition to, change in, and reduction from the configuration of the central control system 500 as shown in FIG. 4.

Figure 8A:
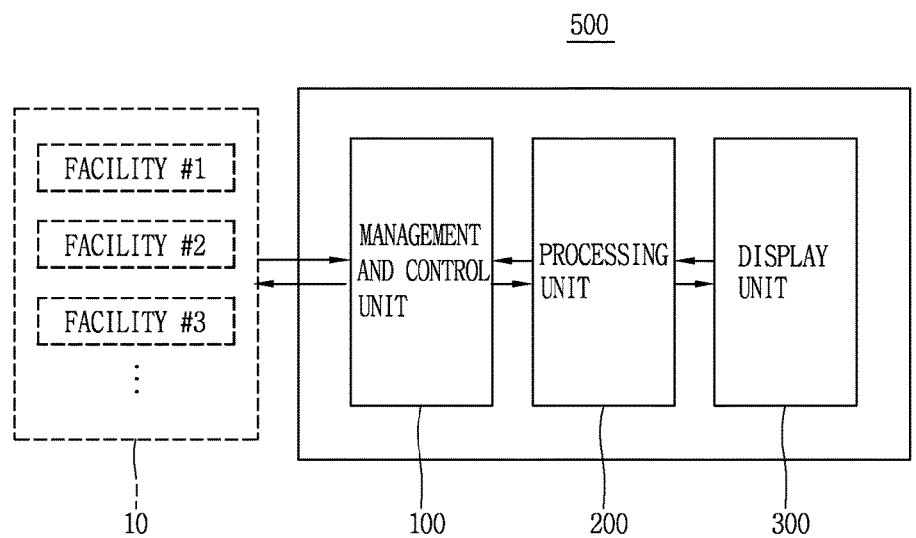
FIG. 8A is a first block diagram showing a configuration of a central control system disclosed in this specification.

As shown in FIG. 8A, the system 500 includes a management and control unit 100 configured to monitor and control the at least one facility 10 and a central control apparatus 400 including a processing unit 200 configured to generate history data regarding the at least one facility 10 on the basis of the monitoring result of the management and control unit 100 and enable the history data to be integrally displayed for each time period on an interface screen that is output and displayed outwardly and a display unit 300 configured to outwardly display the interface screen on which the history data is displayed and a display setting of the history data is made.

That is, the system 500 may be configured to include the management and control unit 100 and the central control apparatus 400.

Figure 8B:
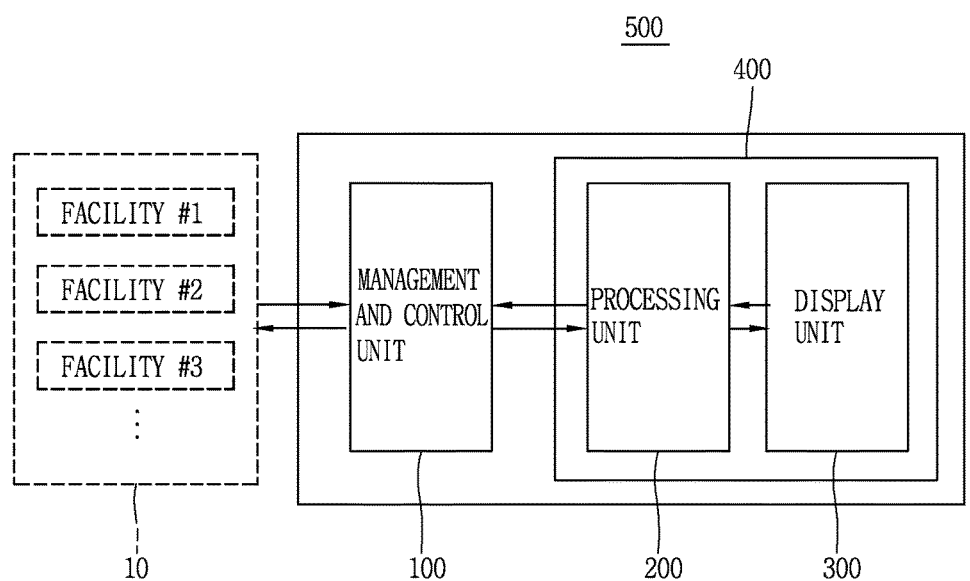
FIG. 8B is a second block diagram showing a configuration of a central control system disclosed in this specification.

Alternatively, as shown in FIG. 8B, the system 500 may include a management and control unit 100 configured to monitor and control the at least one facility 10, a processing unit 200 configured to generate history data regarding the at least one facility 10 on the basis of the monitoring result of the management and control unit 100 and enable the history data to be integrally displayed for each time period on an interface screen that is output and displayed outwardly, and a display unit 300 configured to outwardly display the interface screen on which the history data is displayed and the display setting of the history data is made.

A description will be made below, focusing on such a configuration as shown in FIG. 8a.

The management and control unit 100 may denote a central control unit that integrally monitors and controls the at least one facility 10.

The management and control unit 100 may integrally monitor and control the at least one facility 10 in real time.

The management and control unit 100 may be used to establish the system 500 in communication with the central control apparatus 400.

The management and control unit 100 may integrally monitor and control the at least one facility 10 to transmit the monitoring result to the central control apparatus 400.

The central control apparatus 400 may be, or may be included in, a management apparatus installed inside a building.

The central control apparatus 400 may also be, or may be included in, an apparatus that remotely manages a building.

The at least one facility 10 may be at least one of an air conditioning facility, an indoor device, a illumination facility, a communication facility, a water supply facility, and a power facility.

The central control apparatus 400 may receive, form the management and control unit 100, the monitoring result obtained by monitoring a state of the at least one facility 10.

The central control apparatus 400 may receive the monitoring result in real time.

That is, the monitoring result may include current status information of the at least one facility 10.

The monitoring result may be a result for the al least one facility 10.

The monitoring result may be transmitted to the processing unit 200 of the central control apparatus 400 every hour.

The processing unit 200 at least generates the history data for each time period on the basis of the monitoring result.

The processing unit 200 may generate the history data every hour.

The processing unit 200 may generate the history data in units of seconds/minutes/hours.

Upon generating the history data, the processing unit 200 may generate the history data such that a time at which the history data is generated is recorded.

The processing unit 200 enables the history data to be integrally displayed on the interface screen for each time period.

The processing unit 200 may enable the history data to be displayed according to the display setting and the display method selected through the interface screen.

The processing unit 200 may perform a linear regression analysis on the basis of the past and current history data, predict variation in the history data, and enable a prediction result to be displayed.

The processing unit 200 may determine whether to additionally generate the history data every time period and enable the additionally generated history data to be displayed.

The processing unit 200 allows the display unit 300 to outwardly display the interface screen on which the history data is displayed and the display setting of the history data is made.

The interface screen may be a screen that is output outwardly through the display unit 300 and displayed to a user.

That is, the interface screen may be an interface screen of an operating program of the system 500, which is provided to a user of the system 500.

The interface screen of the system 500 may be carried out as shown in FIG. 5, which illustrates the above-described embodiment of the central control apparatus 400, and thus will be described with reference to FIG. 5.

As shown in FIG. 5, the interface screen 310 of the system 500 includes a time line window 311 in which the history data is displayed according to a time period and at least one setting window 312a, 312b, 312c in which display setting of the history data is made. A type of the at least one facility 10 is displayed in the time line window 311, and the history data corresponding to the at least one facility 10 is displayed according to the time period. At least one of a type, a display style, a specific date, and a time period of the history data to be displayed in the time line window 311 or a combination thereof may be set in the setting windows 312a, 312b, and 312c.

The system 500 may enable a control command for the at least one facility 10 to be input through the interface screen 310. The processing unit 200 may generate control history data in response to the control command to enable the generated control history data to be displayed on the interface screen 310, and the management and control unit 100 may control the at least one facility 10 according to the control command.

That is, when the control command is input, the processing unit 200 generates the control history data and enables the control history data to be displayed through the interface screen 310 of the display unit 300, and delivers the control command input to the management and control unit 100 to enable the management and control unit 100 to control a facility corresponding to the control command.

The system 500 may enable a predictive control command for the at least one facility 10 to be input through the interface screen 310. The processing unit 200 may generate predictive history data in response to the predictive control command to enable the generated predictive history data to be displayed on the interface screen 310, and the management and control unit 100 may control the at least one facility 10 according to the predictive control command.

That is, when the predictive control command is input, the processing unit 200 generates the control history data and enables the control history data to be displayed through the interface screen 310 of the display unit 300, and delivers the predictive control command input to the management and control unit 100 to enable the management and control unit 100 to control a facility corresponding to the predictive control command.

The system 500 may also enable a search and check of the history data through the interface screen 310. The processing unit 200 may enable the history data corresponding to the search and check and information regarding the at least one facility 10 corresponding to the history data to be displayed.

A display method and a central control method of the central control apparatus disclosed in the specification will be described below with reference to FIGS. 9 and 10.

The display method and the central control method of the central control apparatus disclosed in the specification may be implemented with some or a combination of elements or steps included in the above-described embodiments or may be implemented as a combination of the embodiments. Technical terms used herein are merely used to describe a specific embodiment, but not to limit the technical ideal disclosed in the specification.

The display method and the central control method of the central control apparatus disclosed in the specification may be applied to the above-described central control apparatus and system, and thus redundant description thereof is omitted.

The display method of the central control apparatus (hereinafter, referred to as a display method) may be a display method of the central control apparatus, in which the history data regarding the at least one facility is outwardly displayed through the interface screen.

In the above described central control apparatus and central control apparatus included in the system, the display method may relate to a process of the processing unit enabling the history data to be displayed in the display unit.

In the above described central control apparatus and central control apparatus included in the system, the display method may relate to a process of executing an operating program of the central control apparatus and the system.

As shown in FIG. 9, the display method includes generating history data on the basis of a result of monitoring at least one facility (S10), collecting the history data (S20), and integrally displaying the history data on the interface screen for each time period (S30).

The display method may further include making a display setting of the display method on the interface screen.

The making of the display setting may denote applying the display setting that is made on the interface screen.

That is, according to the display setting applied during the display setting, the history data may be displayed on the interface screen.

The display setting may be made before the integrally displaying (S30).

For example, the display setting may be made between the generating of the history data (S10) and the collecting of the history data (S20) or between the collecting of the history data (S20) and the integrally displaying (S30).

The display method may be carried out by applying to the above described central control apparatus or the central control apparatus included in the above described system.

The display method may also be carried out separately or by applying to a process of executing software that monitors and manages the at least one facility.

The central control method (hereinafter, referred to as a control method) may be a central control method of a central control system that manages at least one facility.

In the above described system, the display method may relate to a process of the processing unit enabling the history data to be displayed in the display unit.

In the above described system, the control method may relate to a process of executing an operating program of the system.

As shown in FIG. 10, the control method includes monitoring and controlling at least one facility (S40), generating history data regarding the at least one facility on the basis of a monitoring result obtained through the monitoring and controlling (S50), checking display setting of an interface screen outwardly output and displayed (S60), and integrally displaying the history data on the interface screen for each time period according to the display setting (S70).

The control method may be carried out by applying to the above-described system.

The control method may also be carried out separately or by applying to a process of executing software that monitors and manages the at least one facility.

The embodiments of the central control apparatus, the central control system, and the display method of the central control apparatus disclosed in the specification may be carried out by applying to a building management apparatus and a building management system.

The embodiments of the central control apparatus, the central control system, and the display method of the central control apparatus disclosed in the specification may be carried out by applying to a facility monitoring apparatus and system.

The embodiments of the central control apparatus, the central control system, and the display method of the central control apparatus disclosed in the specification may be carried out by applying to an equipment integration control apparatus and system, a plant control apparatus and system, a building history management apparatus and system, and an integration control apparatus and system.

The embodiments of the central control apparatus, the central control system, and the display method of the central control apparatus disclosed in the specification may be carried out by usefully applying to an interface applying to the above apparatuses and systems and software for driving the interface.

The central control apparatus, the central control system, and the display method of the central control apparatus disclosed in the specification have an effect of easily and conveniently figuring out information regarding a management history and a current status of the entire facility system by integrally displaying various pieces of history information needed to operate and manage the entire facility according to the time period.

The central control apparatus, the central control system, and the display method of the central control apparatus disclosed in the specification have an effect of intuitively determining an association between various pieces of history information by integrally displaying the various pieces of history information needed to operate and manage the entire facility according to the time period.

The central control apparatus, the central control system, and the display method of the central control apparatus disclosed in the specification have an effect of intuitively determining information regarding a current status of the entire facility system by integrally displaying the various pieces of history information needed to operate and manage the entire facility according to the time period.

The central control apparatus, the central control system, and the display method of the central control apparatus disclosed in the specification have an effect of performing efficient management according to the current status of the entire system by intuitively determining the association between the various pieces of history information and information regarding a current status of the entire building.

The central control apparatus, the central control system, and the display method of the central control apparatus disclosed in the specification have an effect of efficiently managing and monitoring an individual facility by intuitively determining the association between the various pieces of history information and information regarding a current status of the entire building.

While the above-described preferred embodiments of the present invention have been disclosed to solve the technical problem, it will be understood by those of ordinary skill in the art that various modifications, changes, additions or the like can be made therein without departing from the spirit and scope as defined by the following claims.

The invention claimed is:

1. A central control apparatus that manages a plurality of facilities, the central control apparatus comprising:
   a processing unit configured to generate history data regarding the plurality of facilities based on a result of monitoring a state of the plurality of facilities and enable the history data to be integrally displayed on an interface screen outwardly output and displayed according to a time period; and
   a display unit configured to outwardly display the interface screen on which (a) the history data is displayed and (b) a display setting of the history data is displayed,
   wherein the interface screen comprises:
      a time line window in which the history data is displayed according to the time period; and
      at least one setting window in which the display setting of the history data is displayed,
      wherein the processing unit configured to control the display unit to display a type of the plurality of facilities in the time line window, and the history data corresponding to the plurality of facilities according to the time period in the time line window, and
      wherein the display unit configured to display the type of the plurality of facilities on the time line window, and the history data corresponding to the plurality of facilities according to the time period on the time line window, by the controlling of the processing unit,
   wherein a predictive control command for the plurality of facilities is input through the interface screen, and
   wherein the processing unit generates predictive history data in response to the predictive control command to enable the generated predictive history data to be displayed on the interface screen and enable the plurality of facilities to be controlled according to the predictive control command.

2. The central control apparatus of claim 1, wherein,
   at least one of a type, a display style, a specific date, and a time period of the history data to be displayed in the time line window or a combination thereof is set in the setting window,
   the type of the history data is composed of a group classified according to any one of a floor or area in which the plurality of facilities are respectively installed and a use of the plurality of facilities,
   the display style is a form or color in which the history data is displayed,
   the specific date and time period are a date and time period on which the history data is to be displayed, and
   the history data is displayed in the time line window according to the setting selected through the setting window.

3. The central control apparatus of claim 1, wherein the processing unit enables the history data to be displayed according to the display setting selected through the interface screen.

4. The central control apparatus of claim 1, wherein the processing unit performs a linear regression analysis based on past and current history data, predicts variation in the history data, and enables a prediction result to be displayed.

5. The central control apparatus of claim 1, wherein the processing unit determines whether to additionally generate the history data every time period and enables the additionally generated history data to be displayed.

6. The central control apparatus of claim 1, wherein,
   a control command for the plurality of facilities is input through the interface screen, and
   the processing unit generates control history data in response to the control command to enable the generated control history data to be displayed on the interface screen and enable the plurality of facilities to be controlled according to the control command.

7. The central control apparatus of claim 1, wherein,
   a search and check of the history data are made through the interface screen, and
   the processing unit enables the history data corresponding to the search and check and information regarding the plurality of facilities corresponding to the history data to be displayed.

8. A central control system that manages a plurality of facilities, the central control system comprising:
   a management and control unit configured to monitor and control the plurality of facilities; and
   a central control apparatus comprising:
      a processing unit configured to generate history data regarding the plurality of facilities based on a monitoring result of the management and control unit and enable the history data to be integrally displayed on an interface screen outwardly output and displayed according to a time period; and
      a display unit configured to outwardly display the interface screen on which (a) the history data is displayed and (b) a display setting of the history data is displayed,
      wherein the interface screen comprises:
         a time line window in which the history data is displayed according to a time period; and
         at least one setting window in which display setting of the history data is displayed,
         wherein in the time line window:
            a respective type of the plurality of facilities is displayed, and
            the history data corresponding to the at least one facility is displayed according to the time period,
         wherein in the setting window:
            at least one of a type, a display style, a specific date, and a time period of the history data to be displayed in the time line window or a combination thereof is set in the setting window,
   wherein the processing unit configured to control the display unit to display a type of the plurality of facilities in the time line window, and the history data corresponding to the plurality of facilities according to the time period in the time line window, and
   wherein the display unit configured to display the type of the plurality of facilities on the time line window, and the history data corresponding to the plurality of facilities according to the time period on the time line window, by the controlling of the processing unit, wherein a predictive control command for the plurality of facilities is input through the interface screen, and wherein the processing unit generates predictive history data in response to the predictive control command to enable the generated predictive history data to be displayed on the interface screen and enable the plurality of facilities to be controlled according to the predictive control command.

9. The central control system of claim 8, wherein the processing unit enables the history data to be displayed according to a display setting and a display method selected through the interface screen.

10. The central control system of claim 8, wherein the processing unit performs a linear regression analysis based on past and current history data, predicts variation in the history data, and enables a prediction result to be displayed.

11. The central control system of claim 8, wherein the processing unit determines whether to additionally generate the history data every time period and enables the additionally generated history data to be displayed.

12. The central control system of claim 8, wherein, a control command for the plurality of facilities is input through the interface screen, and the processing unit generates control history data in response to the control command to enable the generated control history data to be displayed on the interface screen, and the management and control unit controls the plurality of facilities according to the control command.

13. The central control system of claim 8, wherein, the management and control unit controls the plurality of facilities according to the predictive control command.

14. The central control system of claim 8, wherein, a search and check of the history data are made through the interface screen, and the processing unit enables the history data corresponding to the search and check and information regarding the plurality of facilities corresponding to the history data to be displayed.

15. A display method of a central control apparatus that outwardly displays history data regarding a plurality of facilities through an interface screen, the display method comprises:

generating the history data based on a result of monitoring the plurality of facilities;

collecting the history data; and integrally displaying the history data on the interface screen for each time period, wherein the interface screen comprises:

a time line window in which the history data is displayed according to a time period; and at least one setting window in which display setting of the history data is displayed, wherein in the time line window:

a type of the plurality of facilities is displayed, and the history data corresponding to the plurality of facilities is displayed according to the time period, and wherein in the setting window:

at least one of a type, a display style, a specific date, and a time period of the history data to be displayed in the time line window or a combination thereof is set in the setting window, wherein the step of integrally displaying displays the type of the plurality of facilities on the time line window, and the history data corresponding to the plurality of facilities according to the time period on the time line window, wherein a predictive control command for the plurality of facilities is input through the interface screen, and wherein the display method further comprising:

generating predictive history data in response to the predictive control command to enable the generated predictive history data to be displayed on the interface screen and enabling the plurality of facilities to be controlled according to the predictive control command.

16. The display method of claim 15, further comprising making display settings of the display method on the interface screen.

* * * * *